(12) United States Patent
Choi

(10) Patent No.: US 11,180,185 B2
(45) Date of Patent: Nov. 23, 2021

(54) SYSTEM AND METHOD FOR CONTROLLING MOTOR DRIVEN POWER STEERING

(71) Applicants: Hyundai Motor Company, Seoul (KR); Kia Motors Corporation, Seoul (KR)

(72) Inventor: In Kwon Choi, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 277 days.

(21) Appl. No.: 16/383,097

(22) Filed: Apr. 12, 2019

(65) Prior Publication Data
US 2020/0156695 A1 May 21, 2020

(30) Foreign Application Priority Data
Nov. 19, 2018 (KR) .................. 10-2018-0142278

(51) Int. Cl.
  *B62D 5/04* (2006.01)
  *G01L 5/22* (2006.01)
  *B60W 10/20* (2006.01)
  *B62D 6/10* (2006.01)

(52) U.S. Cl.
  CPC ............. *B62D 5/046* (2013.01); *B60W 10/20* (2013.01); *B62D 6/10* (2013.01); *G01L 5/221* (2013.01)

(58) Field of Classification Search
  CPC .......... B62D 5/00; B62D 5/04; B62D 5/0457; B62D 5/046; B62D 6/00; B62D 6/08; B62D 6/10; B60W 10/00; B60W 10/20; G01L 5/00; G01L 5/22; G01L 5/221
  See application file for complete search history.

(56) References Cited

U.S. PATENT DOCUMENTS

| | | | |
|---|---|---|---|
| 2008/0035411 A1* | 2/2008 | Yamashita | B62D 5/049 180/443 |
| 2008/0097669 A1* | 4/2008 | Kasbarian | B62D 6/10 701/42 |
| 2011/0098888 A1* | 4/2011 | Kariatsumari | H02P 21/0003 701/41 |

(Continued)

FOREIGN PATENT DOCUMENTS

| | | |
|---|---|---|
| JP | 2001-106107 A | 4/2001 |
| JP | 2008-180732 A | 8/2008 |

(Continued)

*Primary Examiner* — James M McPherson
*Assistant Examiner* — Michael Allen Brace, Jr.
(74) *Attorney, Agent, or Firm* — Mintz Levin Cohn Ferris Glovsky and Popeo, P.C.; Peter F. Corless

(57) ABSTRACT

A method and system for controlling motor driven power steering are provided. The system includes a magnetic field generation detection module that detects generation of a magnetic field upon operating an electric part of a vehicle and a torque offset determination unit that determines whether a temporary torque offset has occurred in a torque to be applied to a motor based on a detection signal of the magnetic field generation detection module. A torque offset correction unit then corrects the torque offset to a normal torque range based on a torque offset correction logic in response to determining that the torque offset has occurred.

4 Claims, 3 Drawing Sheets

(56) References Cited

U.S. PATENT DOCUMENTS

| | | | | |
|---|---|---|---|---|
| 2012/0205187 A1* | 8/2012 | Izutani | ................... | B62D 5/046 |
| | | | | 180/446 |
| 2015/0211469 A1* | 7/2015 | Ghoneim | ............ | F02N 11/0825 |
| | | | | 701/113 |
| 2015/0353128 A1* | 12/2015 | Shibuya | ................. | B62D 5/001 |
| | | | | 701/41 |
| 2017/0066473 A1* | 3/2017 | Yu | ............................ | B62D 6/10 |
| 2018/0029635 A1* | 2/2018 | Kuroda | .................... | B62D 3/12 |

FOREIGN PATENT DOCUMENTS

| | | | |
|---|---|---|---|
| JP | 2011-196858 A | | 10/2011 |
| JP | 2014-102145 A | | 6/2014 |
| KR | 10-2006-0045219 A | | 5/2006 |
| KR | 10-2008-0083554 A | | 9/2008 |
| KR | 10-2009-0120718 A | | 11/2009 |
| KR | 10-2017-0049228 A | | 5/2017 |

* cited by examiner

SYSTEM AND METHOD FOR CONTROLLING MOTOR DRIVEN POWER STEERING

CROSS-REFERENCE TO RELATED APPLICATION

This application claims under 35 U.S.C. § 119(a) the benefit of priority to Korean Patent Application No. 10-2018-0142278 filed on Nov. 19, 2018, the entire contents of which are incorporated herein by reference.

BACKGROUND

(a) Technical Field

The present disclosure relates to a system and method for controlling motor driven power steering, and more particularly, to a system and method for controlling motor driven power steering to automatically correct a temporary steering torque offset caused by influence of a magnetic field.

(b) Background Art

In general, a motor driven power steering (MDPS) system is installed within the vehicle as a steering device for changing the steering force of a steering wheel according to the traveling speed of a vehicle. The motor driven power steering system includes a torque sensor configured to sense a steering torque, a steering angle sensor configured to sense a steering angle, a vehicle speed sensor configured to sense a vehicle speed, a steering controller configured to calculate a current control value for steering assist based on the sensing signals (tuning parameters) of the sensors, and a motor that operates for steering assist according to current applied by the steering controller.

In the motor driven power steering system, when a magnetic torque sensor is used as the torque sensor, the signal of the torque sensor may be distorted by a peripheral magnetic field. For example, when the starter motor of the vehicle operates, the magnetic field is generated. The sensing signal of the torque sensor of the motor driven power steering system may be distorted due to the generated magnetic field, thereby causing a torque offset in which the torque applied to the motor temporarily deviates from a predetermined threshold value. Further, when the torque offset temporarily occurs, a phenomenon wherein a steering wheel temporarily vibrates may occur. For a vehicle, to which an idle stop and go (ISG) system is applied, since an engine frequently stops and restarts, the torque offset occurs whenever the engine restarts and thus the steering wheel frequently vibrates.

SUMMARY

The present invention provides a system and method for controlling motor driven power steering, which prevent a steering wheel from vibrating, by correcting a torque offset to an original normal torque, even when the sensing signal of a torque sensor of the motor driven power steering system is distorted due to a magnetic field generated upon operating an electric part (e.g., a starter motor) of a vehicle to cause the torque offset in which the torque to be applied to a motor deviates from a predetermined normal torque range.

In one aspect, a system for controlling motor driven power steering may include a magnetic field generation detection module configured to detect generation of a magnetic field upon operating an electric part of a vehicle, a torque offset determination unit configured to determine whether a temporary torque offset has occurred in a torque to be applied to a motor based on a detection signal of the magnetic field generation detection module, and a torque offset correction unit configured to correct the torque offset to a normal torque range based on a torque offset correction logic in response to determining that the torque offset has occurred.

In an exemplary embodiment, the magnetic field generation detection module may include an idle stop and go (ISG) state detector configured to detect whether an ISG system is operating, an engine state detector configured to detect whether an engine is in a driving state or a stopped state, a vehicle speed sensor configured to sense a current vehicle speed, and a torque sensor configured to sense a steering torque of a steering wheel.

In another exemplary embodiment, the torque offset determination unit may be configured to determine that the temporary torque offset has occurred in the torque to be applied to the motor, upon simultaneously receiving a signal indicating that the ISG system is operating from an ISG state detector, a signal indicating that the engine is in a cranking state from an engine state detector, a signal indicating that a current vehicle speed is less than a threshold speed from a vehicle speed sensor, and a signal indicating that a torque change is within a threshold range from a torque sensor.

In another aspect, a method of controlling motor driven power steering may include detecting generation of a magnetic field in a magnetic field generation detection module upon operating an electric part of a vehicle, a torque offset determination unit determining whether a temporary torque offset has occurred in a torque to be applied to a motor based on a detection signal of the magnetic field generation detection module, and a torque offset correction unit correcting the torque offset to a normal torque range based on a predetermined torque offset correction logic, in response to determining that the torque offset has occurred.

In an exemplary embodiment, the detecting of generation of the magnetic field may include detecting, by an idle stop and go (ISG) state detector, whether an ISG system is operating, detecting, by an engine state detector, whether an engine is in a driving state or a stopped state; sensing, by a vehicle speed sensor, a current vehicle speed, and sensing, by a torque sensor, a steering torque of a steering wheel.

In another exemplary embodiment, the determining of whether the torque offset has occurred may include determining that the temporary torque offset has occurred in the torque to be applied to the motor, upon simultaneously receiving a signal indicating that the ISG system is operating from an ISG state detector, a signal indicating that the engine is in a cranking state from an engine state detector, a signal indicating that a current vehicle speed is less than a stopped speed from a vehicle speed sensor, and a signal indicating that a torque change belongs to a threshold range from a torque sensor. In still another exemplary embodiment, the threshold range of the torque change may be set to a range of about 0.4 Nm to 1.0 Nm

BRIEF DESCRIPTION OF THE DRAWINGS

The above and other features of the present invention will now be described in detail with reference to exemplary embodiments thereof illustrated in the accompanying drawings which are given hereinbelow by way of illustration only, and thus are not limitative of the present invention, and wherein.

Figure 1:
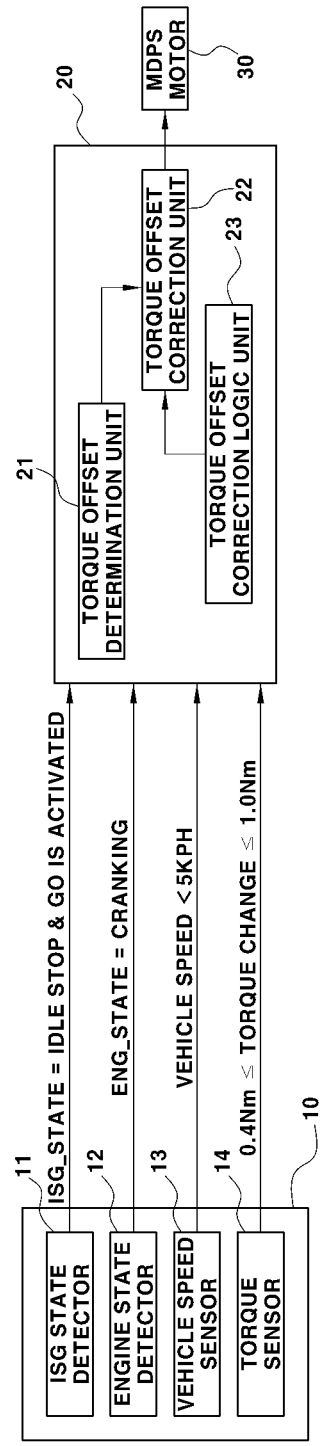
FIG. 1 is a view illustrating the configuration of a system for controlling motor driven power steering according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, the exemplary embodiments of the present invention will be described in detail with reference to the accompanying drawings to allow those skilled in the art to easily practice the exemplary embodiments.

FIG. 1 is a view illustrating the configuration of a system for controlling motor driven power steering according to the present invention. Reference numeral 10 denotes a magnetic field generation sensing module. The magnetic field generation detection module 10 does not directly sense a magnetic field generated when a starter motor as an electric part of a vehicle operates, but may be configured to indirectly sense a situation in which the magnetic field is generated.

As described above, in a vehicle, to which an idle stop and go (ISG) system is applied, an engine frequently stops and restarts. Whenever the engine restarts, a magnetic field is generated by operation of the starter motor as the electric part. The sensing signal of the torque sensor may be distorted by the magnetic field, and a temporary torque offset may be generated in the torque to be applied to a motor.

For reference, the idle stop and go (ISG) system refers to a system configured to stop an engine when a vehicle stops and restart the engine when the vehicle starts, to improve fuel efficiency. Since it is necessary to determine whether the magnetic field is generated to automatically correct the torque offset in a normal torque range, the magnetic field generation detection module 10 may be configured to indirectly sense a situation in which the magnetic field is generated when the vehicle restarts.

Further, the magnetic field generation detection module 10 may include an ISG state detector 11 (e.g., sensor) configured to detect whether the ISG system operates, an engine state detector 12 (e.g., sensor) configured to detect the driving or stopped state of the engine, a vehicle speed sensor 13 configured to sense or measure a current vehicle speed, and a torque sensor 14 configured to sense the steering torque of a steering wheel. The ISG state detector 11 may be configured to detect and transmit whether the ISG system installed in the vehicle is operating, that is, whether the ISG system is activated or deactivated, to a torque offset determination unit 21 of a steering controller 20.

The engine state detector 12 may be configured to detect and transmit whether the engine is being driven, is stopping (stall) based on a command of the ISG system, or is restarting (cranking) in a stopped state based on a command of the ISG system to the torque offset determination unit 21 of the steering controller 20. The vehicle speed sensor 13 may be configured to transmit a current vehicle speed signal to the torque offset determination unit 21 of the steering controller 20, to determine whether the vehicle is stopped. The torque sensor 14 may be configured to sense the steering torque of the steering wheel. In particular, the torque sensor may be configured to sense and transmit torque change when the starter motor as the electric part for restarting the vehicle operates and the engine restarts (cranking) to the torque offset determination unit 21 of the steering controller 20.

Meanwhile, the steering controller 20 may include a torque offset determination unit 21, a torque offset correction unit 22 and a torque offset correction logic unit 23. The torque offset determination unit 21 may be configured to determine whether a temporary torque offset has occurred in the torque to be applied to a motor 30 based on the detection signal of the magnetic field generation detection module 10. More specifically, the torque offset determination unit 21 may be configured to receive the signal indicating whether the ISG system is operating (e.g., the signal indicating whether the ISG system is in an activated state or a deactivated state) from the ISG state detector 11, the signal indicating whether the engine is in a driving state, a stall state or a cranking state (for restarting) from the engine state detector 12, the signal indicating the current vehicle speed from the vehicle speed sensor 13 and the signal indicating the torque change when the engine starts or restarts from the torque sensor 14, and based thereon, determine whether the temporary torque offset has occurred in the torque to be applied to the motor.

Particularly, the torque offset determination unit 21 may be configured to determine that the temporary torque offset has occurred in the torque to be applied to the motor 30, when the signal indicating that the ISG system is operating (in the activated state) from the ISG state detector 11, the signal indicating that the engine is in the cranking state from the engine state detector 12, the signal indicating that the current vehicle speed is less than a threshold speed (e.g., about 5 kph) from the vehicle speed sensor 13 and the signal indicating that the torque change is within a threshold range from the torque sensor 14 are received simultaneously.

The threshold range of the torque change may be set to be about 0.4 Nm to 1.0 Nm. Since the steering wheel vibrates due to the torque offset when the torque change is equal to or less than about 0.4 Nm and a torque state indicates the driver intent to operate the steering wheel when the torque change exceeds about 1.0 Nm, the threshold range of the torque change for determining the torque offset in the torque offset determination unit 21 may be limited to the range of about 0.4 Nm to 1.0 Nm.

Further, the torque offset correction unit 22 may be configured to receive the signal indicating that the temporary torque offset has occurred from the torque offset determination unit 21, correct the torque offset to a normal torque level using a torque offset correction logic (e.g., torque offset correction map data) of the torque offset correction logic unit 23, and apple the corrected torque (the corrected current value) to the motor 30 for steering. Accordingly, the vehicle may be operated based on the corrected torque applied to the motor.

Figure 2:
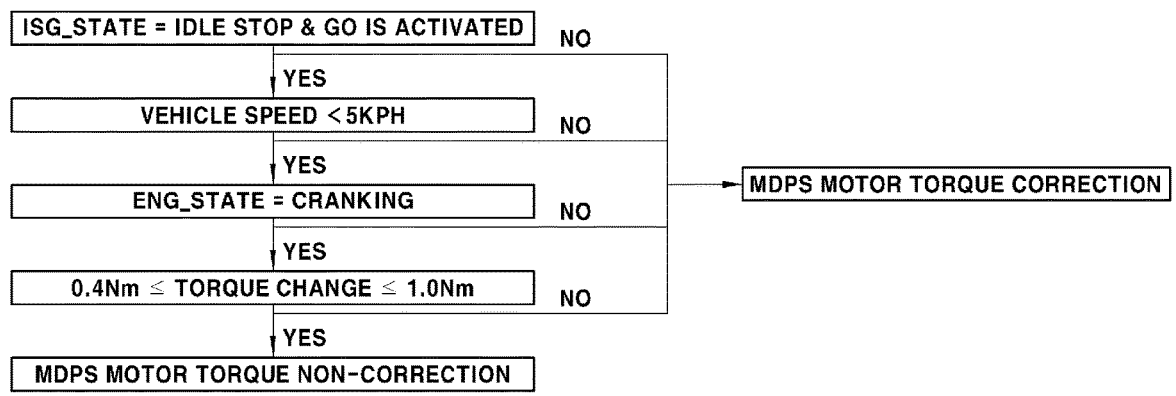
FIG. 2 is a flowchart illustrating a method of controlling motor driven power steering according to an exemplary embodiment of the present invention.
Figure 3:
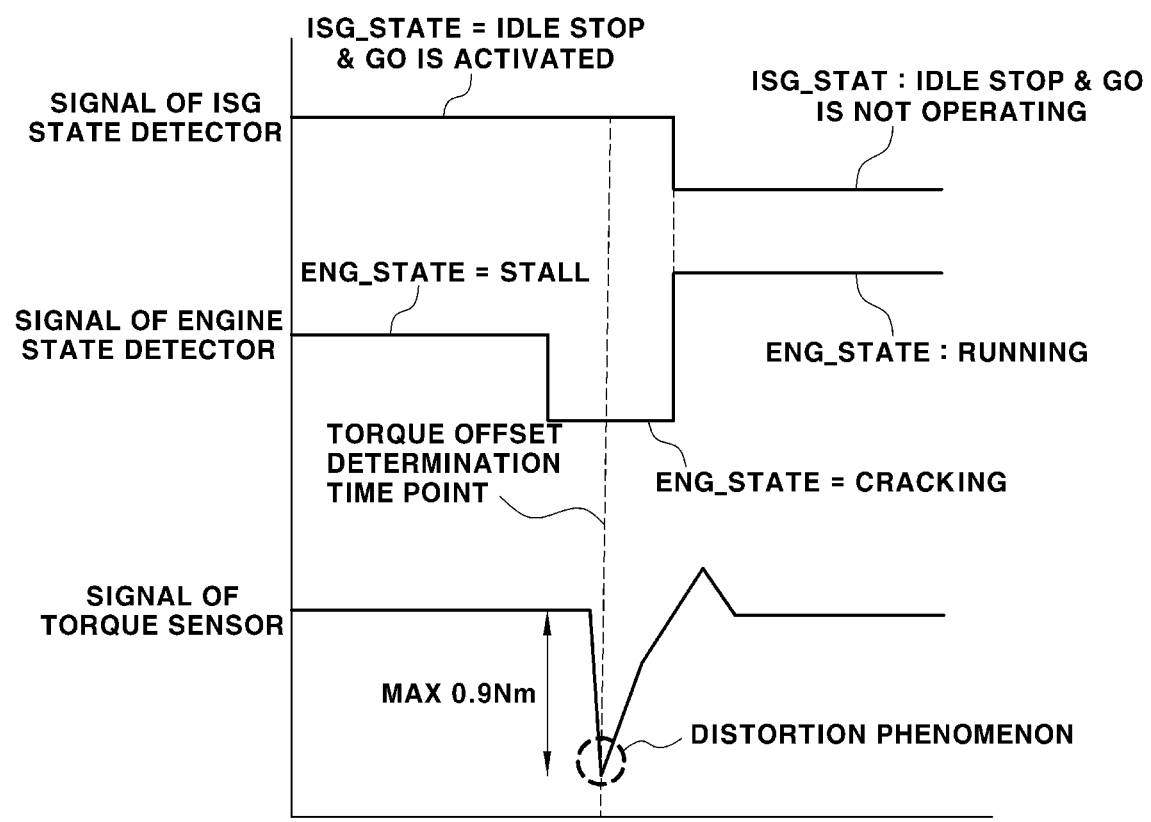
FIG. 3 is a graph illustrating a process of sensing a temporary torque offset in the system for controlling motor driven power steering according to an exemplary embodiment of the present invention.

A process of correcting a torque offset caused by influence of a magnetic field as a method of controlling motor driven power steering will now be described. FIG. 2 is a flowchart illustrating a method of controlling motor driven power steering according to the present invention, and FIG. 3 is a graph illustrating a process of detecting a temporary torque offset in the system for controlling motor driven power steering according to the present invention. The methods described herein below may be executed by the controller.

First, the magnetic field generation detection module 10 may be configured to detect whether the magnetic field is generated upon operating the starter motor as the electric part of the vehicle. The method may include receiving, by the steering controller 20, whether the ISG system is operating based on a detection by the ISG state detector 11; and receiving, by the steering controller 20, from the engine state detector 12, whether the engine is being driven, is stopping (stall) according to the command of the ISG system, or is restarting (cranking) in a stopped state according to the command of the ISG system.

The method may further include receiving, by the steering controller 20, the current vehicle speed signal from the vehicle speed sensor 13; and receiving the signal indicating the steering torque of the steering wheel from the torque sensor 14. The torque offset determination unit 21 of the steering controller 20 may then be configured to determine whether a temporary torque offset has occurred in the torque to be applied to the motor based on the detection signal of the magnetic field generation detection module 10.

Particularly, the torque offset determination unit 21 may be configured to determine that the torque sensor is influenced by the magnetic field and determine that the temporary torque offset has occurred in the torque to be applied to the motor 30, when the signal indicating that the ISG system is operating (in the activated state) from the ISG state detector 11, the signal indicating that the engine is in the cranking state (for restarting) from the engine state detector 12, the signal indicating that the current vehicle speed is less than the threshold speed (e.g., 5 kph) for stopping from the vehicle speed sensor 13 and the signal indicating that the torque change belongs to the threshold range (e.g., the range of about 0.4 Nm to 1.0 Nm) from the torque sensor 14 are received simultaneously.

In contrast, the torque offset determination unit 21 may not be configured to perform torque offset correction, when the signal indicating that the ISG system is not operating (the deactivated state), when the signal indicating that the vehicle speed is equal to or greater than the threshold speed, when the signal indicating that the engine is stopping or being driven, or when the signal indicating that the torque change deviates from the threshold range.

Subsequently, the torque offset correction unit 22 may be configured to receive the signal indicating that the temporary torque offset has occurred from the torque offset determination unit 21, correct the torque offset to the normal torque level using a torque offset correction logic (e.g., torque offset correction map data) of the torque offset correction logic unit 23, and apply the corrected torque (the corrected current value) to the motor 30 for steering. Accordingly, it may be possible to prevent a steering wheel from vibrating, by automatically correcting a torque offset to an original normal torque, even when a magnetic field is generated upon operating an electric part (e.g., a starter motor) of a vehicle and a torque offset is generated due to the magnetic field.

The present disclosure provides the following effects. According to the present disclosure, it may be possible to prevent a steering wheel from vibrating, by correcting a torque offset to an original normal torque, even when the sensing signal of a torque sensor of the motor driven power steering system is distorted due to a magnetic field generated upon operating an electric part (e.g., a starter motor) of a vehicle to cause the torque offset in which the torque to be applied to a motor deviates from a predetermined normal torque range. In particular, in a vehicle, to which an idle stop and go (ISG) system is applied, it may be possible to solve a frequent vibration of a steering wheel due to a torque offset occurring whenever an engine restarts by a starter motor after stopping.

The invention has been described in detail with reference to exemplary embodiments thereof. However, it will be appreciated by those skilled in the art that the present invention may be implemented in various modifications and alterations via, for example, addition, change or omission of constituent elements without departing from the principles and spirit of the invention, and these modifications and alterations are included in the scope of the present invention.

In addition, in the description of the exemplary embodiments of the present invention, a detailed description of known functions and configurations incorporated herein is omitted when it may make the subject matter of the present invention rather unclear. In addition, the terms used in the above description are defined in consideration of the functions in the embodiments of the present invention, and may be replaced by other terms based on intentions of users or operators, customs, or the like. Hence, the meanings of these terms should be based on the whole content of this specification. Accordingly, the above detailed description of the present invention is not intended to limit the present inven-

What is claimed is:

1. A system for controlling motor driven power steering, comprising:
   a magnetic field generation detection device configured to detect generation of a magnetic field upon operating an electric part of a vehicle;
   a steering controller configured to determine whether a temporary torque offset has occurred in a torque to be applied to a motor based on a detection signal of the magnetic field generation detection module, and configured to correct the temporary torque offset to a torque range based on a torque offset correction logic in response to determining that the temporary torque offset has occurred,
   wherein the magnetic field generation detection device includes:
      an idle stop and go (ISG) state detector configured to detect whether an ISG system is operating;
      an engine state detector configured to detect whether an engine is in a driving state or a stopped state;
      a vehicle speed sensor configured to sense a current vehicle speed; and
      a torque sensor configured to sense a steering torque of a steering wheel, and
   wherein the steering controller is configured to determine that the temporary torque offset has occurred in the torque to be applied to the motor, upon simultaneously receiving a signal indicating that the ISG system is operating from an ISG state detector, a signal indicating that the engine is in a cranking state from an engine state detector, a signal indicating that a current vehicle speed is less than a threshold speed from a vehicle speed sensor, and a signal indicating that a torque change is within a threshold range from a torque sensor.

2. The system of claim 1, wherein the threshold range of the torque change is set to a range of about 0.4 Nm to 1.0 Nm.

3. A method of controlling motor driven power steering, comprising:
   detecting, by a magnetic field generation detection device, generation of a magnetic field in the magnetic field generation detection device upon operating an electric part of a vehicle;
   determining, by a steering controller, whether a temporary torque offset has occurred in a torque to be applied to a motor based on a detection signal of the magnetic field generation detection device; and
   correcting, by the steering controller, the temporary torque offset to a torque range based on a predetermined torque offset correction logic, in response to determining that the temporary torque offset has occurred,
   wherein detecting generation of the magnetic field includes:
      detecting, by an idle stop and go (ISG) state detector, whether the ISG system is operating;
      detecting, by a vehicle speed sensor, whether an engine is in a driving state or a stopped state;
      sensing, by a vehicle speed sensor, a current vehicle speed; and
      sensing, by a torque sensor, a steering torque of a steering wheel, and
   wherein determining whether the temporary torque offset has occurred includes:
      determining, by the steering controller, that the temporary torque offset has occurred in the torque to be applied to the motor, upon simultaneously receiving a signal indicating that the ISG system is operating from an ISG state detector, a signal indicating that the engine is in a cranking state from an engine state detector, a signal indicating that a current vehicle speed is less than a threshold speed from a vehicle speed sensor, and a signal indicating that a torque change belongs to a threshold range from a torque sensor.

4. The method of claim 3, wherein the threshold range of the torque change is set to a range of about 0.4 Nm to 1.0 Nm.

* * * * *